UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

POROUS CRYSTALLIZED METAL PLATE.

SPECIFICATION forming part of Letters Patent No. 440,271, dated November 11, 1890.

Application filed March 16, 1888. Serial No. 267,400. (No specimens.)

*To all whom it may concern:*

Be it known that I, CLÉMENT PAYEN, a citizen of the Republic of France, but now residing at the city of Philadelphia, in the county of Philadelphia and State of Pennsylvania, have invented a certain new and Improved Porous Crystallized Metal Plate, &c., of which the following is a specification.

The object of my invention is to produce a porous crystallized metal plate or other structure having the crystalline atomic aggregation preserved therein with geometrical regularity.

My invention consists in subjecting to fusion the salt of a metal either alone or in combination with one or more salts and a metal or one or more salts of that metal, then crystallizing the mass, and then reducing the same to a metallic state and eliminating therefrom all elements foreign to the metal required or that do not form a component part of the same, whereby a chemically-pure porous crystallized metal plate having substantial strength and with the crystalline atomic aggregation preserved therein with geometrical regularity in parallel columns with cells between them will be produced.

In order that my present invention may be fully understood, I will now proceed to describe the manner of conducting the process for the production of a crystallized metal silver plate and then that of producing a crystallized metal lead plate, and hereby refer to my application for a patent filed July 26, 1887, and serially numbered 245,378, as illustrating apparatus in one of the forms for the conduct of my process, to be hereinafter particularly described.

A charge of nitrate of silver is melted or fused in a furnace and then discharged into a mold wherein in a short time the mass in cooling assumes a crystallized form. When the crystallized structure has become more or less cool or perfectly cold, it is removed therefrom for reduction to a metallic state or condition. A series of crystallized plates treated in the above manner is now mounted in a vase containing sulphuric acid and water, the nitrate plates being alternated with plates of equal dimension composed of charcoal, lead, or other material and each provided with a lug forming a conductor, but care being taken in the mounting of the respective plates in the vase to see that each is properly insulated from the other and also from the vase, and, moreover, that the plates are firmly held therein, so that all wabbling will be entirely obviated, and thus warping of the crystalline nitrate plates in the process of reduction to a metallic state entirely prevented. The two systems of plates having been mounted in the vase and properly insulated therein from each other, bars of lead or other material are fitted snugly up against one of the edges of each nitrate plate and held in position by means of insulating-strips introduced between the bars and the vase. A wire is then connected with each of the bars in contact with the system of crystallized nitrate plates and another wire in a similar manner connected with the lugs of the system of charcoal or metal plates and the two wires connected, respectively, with the positive and negative electrodes of a dynamo—that is, the positive electrode is connected through the first-named wire with the system of charcoal or metal plates, while the negative electrode is connected through the second-named wire with the system of crystallized nitrate plates—and in consequence of the electrolysis which takes place the nitrate is decomposed into its two gases—azote (nitrogen) and oxygen—and these two gases escaping into the open air, thereby leaving the crystallized plates in a metallic state with porosity. The crystallized metal silver plates may then be removed from the vase and washed, and thereby brought to a chemically-pure state of perfection with substantial strength for use as filters and many other purposes.

Having described the method of producing a chemically-pure crystallized metal silver plate or other structure from fusing nitrate of silver and crystallizing the mass in the cooling thereof and then reducing the same to a metallic state with porosity by preferably a single electrolysis, I will now proceed to describe the method of producing a chemically-pure crystallized metallic lead plate or other structure by subjecting chloride of lead having combined therewith chloride of zinc or metallic zinc and chloride of cadmium to fusion, then crystallizing the mass, and subsequently reducing said crystallized structure to a metallic state by electrolytic action with as well all elements foreign to the metal required eliminated in the operation. The apparatus for the conduct of this process in forms found practically efficient is illustrated in my application for a patent, filed July 26, 1887, and serially numbered 245,378, and to which I refer. A charge of chloride of lead having combined therewith two per cent., by weight, of chloride of zinc or of metallic zinc (more or less) and two per cent., by weight, of chloride of cadmium (more or less) is subjected to fusion. These chlorides may be added to the charge of chloride of lead before or during the fusion thereof; but I have found very good results may be obtained by the admixture of the chloride of zinc or metallic zinc or chloride of cadmium, or both chlorides, or one of the chlorides and a metal gradually during the fusing of the charge of chloride of lead. The percentage of chloride of zinc or of metallic zinc or chloride of cadmium, or of both chlorides, or one of the chlorides and a metal, will in each case depend upon the degree of porosity desired in the finished product. Furthermore, as the proportion of the chlorides or salts of the metals added or combined with the charge of chloride of lead is increased or diminished, so will the strength of the finished plate or other structure to a greater or less degree be increased or diminished.

In accordance with my invention by combining chloride of cadmium and chloride of zinc or metallic zinc with a charge of chloride of lead a very strong plate may be readily and economically produced, in which the fractures of the plate or other structure will be clean and uniform. Furthermore, in the mixing of simply chloride of cadmium with the charge of chloride of lead a plate can be readily obtained which is not hygroscopic, and this is a very necessary condition, especially if a frame is to be formed around the plate for using the same as an electrode of an electrical accumulator or secondary battery. When metallic zinc or chloride of zinc alone is combined with a charge of chloride of lead, the plate produced therefrom, after crystallization has taken place, will be more or less hygroscopic; but this may be readily obviated by the proper regulation of the quantity of the chloride of zinc or metallic zinc added to the chloride of lead during the fusing of the mass.

Notwithstanding the deliquescent nature of chloride of zinc, a plate produced from a combination of this chloride with chloride of lead will not be impaired to any extent thereby if a maximum degree of porosity is not desired. The simple addition of a certain percentage of chloride of cadmium which is not of a deliquescent nature to the mass will give an excellent product, having the desired degree of porosity and strength.

If a plate of metal zinc is desired, by combining with the cloride of zinc or with one or more other salts of zinc, chloride of lead or chloride of cadmium or an ammonium chloride or salt or any other salt or salts or chloride or chlorides of any of the metals, or a combination of any two or more of them, with the base salt or chloride of the metal by fusion and the treatment to be hereinafter fully described, there may be readily produced a porous crystallized metal plate or other structure of the metal desired with the requisite degree of porosity and strength, and with, as well, the crystalline atomic aggregation preserved with geometrical regularity; and therefore I do not wish to limit myself to the use of the above-mentioned salt of a metal combined with one or more other salts of the metals or a metal, in order that in the production of a metal plate therefrom it may have the characteristic features hereinabove mentioned. The mass or compound having been fused in the manner described is then discharged into a suitable mold, and in a few minutes in cooling the mass or compound will assume a crystallized form therein.

It may be remarked that due regard should be had to the selection of the material for the formation of the mold, and the interior surface thereof should be perfectly smooth. The mold to which preference is given is one made of either brass or bronze and composed of two symmetrical sections hinged together.

In the pouring of a fused mass into a mold, in which the two parts thereof are of equal thicknesses of metal, such mass will commence to cool from each side, and the crystals composing said mass will meet or unite with each other at their summits, sides, or facets, forming columns with geometrical regularity uniformly throughout the mass solidifying—that is, the crystals assuming such geometrical regularity in parallel columns to each other from one side of the mold will meet or unite with the crystals, forming like columns with similar regularity from the opposite side of the mold at the median line of the crystallized structure. When a mold is used having the two parts or sides of unequal thicknesses of metal, the fused mass charged into the mold will cool therein unequally, thereby causing the individual crystals (while forming with geometrical regularity in parallel columns) to assume a fixed position in the structure faster from the side of the mold having the greater thickness of metal than the crystals assuming a fixed position in the plate from the opposite side of the mold of a less thickness of metal—that is, the crystals from one side of the mold will meet or unite with each other, forming columns with those meeting or uniting with each other and forming columns from the opposite side of the mold, and these columns of crystals thus formed will unite with each other from both sides of the mold beyond the median line of the plate or structure. The combined mass having assumed a crystallized form in substantially the manner described and the plate having cooled off therein, it may then be removed for further treatment in the following manner: In a vase containing sulphuric acid and water in the proportion of ten per cent., more or less, a series of the crystallized chloride plates are mounted and alternated with plates of equal dimension composed of ordinary lead, artificial charcoal, or other material, and the two systems of plates properly insulated from each other and from the vase are mounted so that they will not wabble, and thus preventing all tendency of the crystallized chloride plates in the process of reduction to bulge or warp, which, if such should take place, would have a tendency to impair to a greater or less extent their utility for subsequent use. The two systems of plates having been mounted in the vase, wires are connected therewith from the positive and negative electrodes of a dynamo. The system of crystallized chloride plates is in connection with the negative electrode of the dynamo, while the system of lead, charcoal, or other plates is in connection with the positive electrode of the dynamo, and in consequence of the electrolysis which takes place the oxygen and chlorine are separated and caused to attack the system of lead, charcoal, or other plates, while on the system of crystallized plates there will remain zinc and cadmium, both metallic. The crystallized chloride plates having been reduced to a metallic state in the manner above set forth, but still containing cadmium and zinc metallic, may then be removed from said vase into another one containing sulphuric acid and water in about the same proportions, as above described. In this second vase the now crystallized metal lead plates are again alternated with others of ordinary lead or artificial charcoal, as in the previous instance mentioned, and the two systems of plates properly insulated from each other and the second vase are again connected through two separate wires with the positive and negative electrodes of a dynamo, as in the first instance described, but with this exception, that the negative electrode is connected with the system of lead, charcoal, or other plates, while the positive electrode is connected through one of the wires with the crystallized metal lead plates, and in consequence of the second electrolysis which takes place the zinc and cadmium metallic are driven out of the crystallized metal plates and deposited on the lead, charcoal, or other plates and a small percentage of hydrogen is deposited thereon, while the oxygen is caused to attack the crystallized metallic plates. The crystallized plates are thus completed with the porosity desired.

When artificial-charcoal in place of lead or other plates are used in the second electrolysis, the hydrogen evolved will nearly all escape into the open air; but the cadmium and zinc contained in the crystallized metal plates and driven out of them by the operation will be deposited on the artificial-charcoal plates, and as well a very small percentage of hydrogen metallic and the crystallized metal plates are thereby left with the degree of porosity desired. By removing the crystallized metal plates thus treated and washing the same in any convenient manner they will be brought to a chemically-pure state of perfection with great strength for various uses or purposes.

The reduction of the crystallized plates to a metallic state and the elimination of all elements foreign to the metal required or that do not form a component part thereof may be effected as well by chemical action as by electrolysis; and hence I reserve to myself the right to resort to either of these or other methods for the production of the plate or other structure forming the subject-matter of my present application for a patent.

Having thus described the nature and objects of my invention, what I claim as new, and desire to secure by Letters Patent, is—

1. The herein-described crystallized metal plate having the crystals existing in columns therein from each face of the plate in the direction of the median line thereof and with cells between said columns of crystals, substantially as and for the purposes set forth.

2. The herein-described crystallized metal plate having the crystals existing in parallel columns therein from each face of the plate to the median line thereof and with cells between said columns of crystals, substantially as and for the purposes set forth.

In witness whereof I have hereunder set my signature in the presence of two subscribing witnesses.

CLÉMENT PAYEN.

Witnesses:
 CHAS. HART,
 GEO. W. REED.